United States Patent
Benfarah et al.

(10) Patent No.: US 9,559,846 B2
(45) Date of Patent: Jan. 31, 2017

(54) METHOD OF PROCESSING A DATA PACKET BEFORE TRANSMISSION OVER A RADIO COMMUNICATIONS NETWORK, A METHOD OF PROCESSING A RECEIVED DATA PACKET, AND ASSOCIATED DEVICES AND SYSTEMS

(75) Inventors: Ahmed Benfarah, Padua (IT); Cedric Lauradoux, Grenoble (FR); Benoit Miscopein, Grenoble (FR)

(73) Assignee: ORANGE, Paris (FR)

(*) Notice: Subject to any disclaimer, the term of this patent is extended or adjusted under 35 U.S.C. 154(b) by 252 days.

(21) Appl. No.: 14/130,245

(22) PCT Filed: Jun. 29, 2012

(86) PCT No.: PCT/FR2012/051514
§ 371 (c)(1),
(2), (4) Date: May 5, 2014

(87) PCT Pub. No.: WO2013/001248
PCT Pub. Date: Jan. 3, 2013

(65) Prior Publication Data
US 2014/0233733 A1   Aug. 21, 2014

(30) Foreign Application Priority Data

Jun. 30, 2011   (FR) .................................. 11 55911

(51) Int. Cl.
*H04L 9/00* (2006.01)
*H04L 9/14* (2006.01)
(Continued)

(52) U.S. Cl.
CPC .................. *H04L 9/14* (2013.01); *H04B 1/713* (2013.01); *H04B 1/71632* (2013.01);
(Continued)

(58) Field of Classification Search
CPC ........................................................ H04L 9/00
See application file for complete search history.

(56) References Cited

U.S. PATENT DOCUMENTS

| 2004/0174928 A1* | 9/2004 | Siwiak | H04B 1/71635 375/146 |
|---|---|---|---|
| 2008/0012688 A1 | 1/2008 | Ha et al. | |
| 2008/0144701 A1* | 6/2008 | Gold | H04B 1/7143 375/132 |

OTHER PUBLICATIONS

English translation of the International Written Opinion dated Dec. 31, 2013 for corresponding International Application No. PCT/FR2012/051514, filed Jun. 29, 2012.
(Continued)

*Primary Examiner* — Josnel Jeudy
(74) *Attorney, Agent, or Firm* — David D. Brush; Westman, Champlin & Koehler, P.A.

(57) ABSTRACT

A method for processing a data packet before transmission over a radio communications network as a succession of waveforms transmitted at positions defined by hopping codes, which are time positions or frequency positions. The packet is transmitted over a communications channel of the network by a transmitter node to a destination node. The method includes the following steps performed for each bit of the data packet to be transmitted, referred to as the current bit: calculating a hopping code at least as a function of the value of the current bit and of an encryption key generated by a pseudo-random generator, the encryption key having size greater than the maximum size of a data packet transmitted over the channel; and causing a waveform to be transmitted at the position defined by the calculated hopping code, the transmitted waveform being identical regardless of the value of the current bit.

11 Claims, 4 Drawing Sheets

(51) Int. Cl.
*H04B 1/7163* (2011.01)
*H04J 13/00* (2011.01)
*H04L 29/06* (2006.01)
*H04B 1/713* (2011.01)
*H04B 1/69* (2011.01)

(52) U.S. Cl.
CPC ...... *H04J 13/0074* (2013.01); *H04L 63/0435* (2013.01); *H04B 2001/6904* (2013.01)

(56) References Cited

OTHER PUBLICATIONS

"Multiple access with time-hopping impulse modulation" by R. Scholtz, published in the Proceedings of the 1993 "Military Communications Conference" (MILCOM '93), conference record "Communications on the Move", IEEE, vol. 2, No., pp. 447 450, vol. 2, Oct. 11 14, 1993.
IEEE Standard for Local and Metropolitian Area Networks—Part 15.4: Low-Rate Wireless Perinal Area Networks (LR-WPANs), IEEE Std 802.15.4-2011 (Revision of IEEE Std 802.15.4-2006), Sep. 5, 2011.
International Search Report and Written Opinion opinion dated Aug. 17, 2012 for corresponding International Application PCT/FR2012/051514, filed Jun. 29, 2012.
P. Yu et al., "Securing RFTD with Ultra-Wideband Modulation", Workshop on RFID Security—RFIDSEC 2006; GRAZ 2006, Jul. 12, 2006 (Jul. 12, 2006), XP002668852.
Miyong Ko et al., "Wireless Physical-Layer Security Performance of UWB Systems", IEEE Military Communications Conference—WILCOM 2010, Oct. 31, 2010 (Oct. 31, 2010), pp. 2143-2148, XP031844062.
Ha D. S. et al., "Replacing Cryptography with Ultra Wideband (UWB) Modulation in Securer RFID" IEEE International Conference on RFID, 2007, Jan. 1, 2007 (Jan. 1, 2007), pp. 23-29, XP031174002.
Jian Lao et al., "A Novel Chaotic Stream DS-UWB System", IEEE International Joint Conference in Neural Networks, Jun. 1, 2008 (Jun. 1, 2008), pp. 835-839, XP031327630.
Chunyan Han et al., "A Novel Multi-Address Chaotic Sequence for TH-PPM-UWB System", IEEE International Conference on Communications, Circuits and Systems—ICCCAS 2010, Jul. 28, 2010 (Jul. 28, 2010), pp. 764-768, XP031760545.

\* cited by examiner

METHOD OF PROCESSING A DATA PACKET BEFORE TRANSMISSION OVER A RADIO COMMUNICATIONS NETWORK, A METHOD OF PROCESSING A RECEIVED DATA PACKET, AND ASSOCIATED DEVICES AND SYSTEMS

CROSS-REFERENCE TO RELATED APPLICATIONS

This Application is a Section 371 National Stage Application of International Application No. PCT/FR2012/051514, filed Jun. 29, 2012, which is incorporated by reference in its entirety and published as WO 2013/001248 on Jan. 3, 2013, not in English.

1. FIELD OF THE INVENTION

The field of the invention is that of telecommunications, and more particularly that of a packet communications network performing a communications technique using impulse radio based on using a time hopping (TH) code, such as for example an ultra-wideband (UWB) technique. The field of the invention is likewise that of a packet communications network performing a frequency hopping spread spectrum (FH-SS) radio communications technique based on using a frequency hopping code.

The present invention relates to a method of processing a data packet before transmission by a node of such a network. The invention also relates to a processor device performing such a method.

The invention also relates to a method of processing such a data packet received by a node of such a network. The invention also relates to a processor device for performing the method.

The invention also relates to a node including such devices. Finally, the invention relates to a communications system comprising a plurality of such nodes.

The invention applies in particularly advantageous manner to protecting wireless communications systems, in particular against attacks of the eavesdropping type or of the jamming type.

2. DRAWBACKS OF THE PRIOR ART

Consideration is given more particularly to impulse UWB communications, which consists in transmitting information by means of impulses of very short duration with a very short duty ratio, giving rise to very low mean power.

By the nature of the radio link in a wireless communications network, it is relatively easy for a malicious third party to intercept a communication and thus threaten the confidentiality of the information being transmitted between the transmitter and the legitimate destination.

Consequently, such a wireless network can be subjected to at least two types of attack:
  accessing the content of the messages exchanged, known as "eavesdropping"; and
  denial of service (DoS) by jamming.

In the state of the art, data is transmitted by impulse radio by means of a time hopping code having the main function of avoiding spectrum lines due to impulses being transmitted periodically.

In a first known technique, e.g. as described in the document entitled "Multiple access with time-hopping impulse modulation" by R. Scholtz, published in the Proceedings of the 1993 "Military Communications Conference" (MILCOM '93), conference record "Communications on the Move", IEEE, Vol. 2, No., pp. 447-450, Vol. 2, Oct. 11-14, 1993, the transmission of an impulse is offset relative to a preceding impulse by a certain number of unit time slots, where this number is given by a periodic code. For example, a symbol is transmitted in a symbol time by means of 8 impulses at time slots that are offset relative to one another using a hopping code having the form [8, 2, 6, 5, 3, 4, 7, 1].

In a second known technique as specified in the IEEE standard 802.15.4-2007, the impulses are no longer transmitted in isolation, but they are grouped together in bursts of impulses that are transmitted once only in the symbol time.

The fundamental modulation is of the pulse position modulation (PPM) type. The burst is transmitted in the first or the second half of the symbol time depending on the value of the bit to be coded. Each half symbol time is itself subdivided into two halves. The second is not used for transmission so as to leave a guard time between two consecutive bursts and thus limit any risk of interference between symbols. A burst can thus be transmitted in the first fourth or in the third fourth of the symbol time. The time instant of transmission in one or other of those fourths is defined by a time hopping code.

With those two prior art techniques, the transmission of an impulse or of a burst over the radio link of the network is thus governed by a periodic time hopping code. This periodicity makes the link vulnerable to attacks of the eavesdropping type.

A malicious node can listen to the channel and can manage to learn the sequence of the periodic hopping code that is being used. Knowing the hopping code sequence used for transmission, an attacker can then easily predict the instants at which impulses will be transmitted. Such an attacker can thus demodulate the intercepted data packet, which constitutes an attack on confidentiality.

Knowing the hopping code thus also enables a jamming type attack to be performed effectively by transmitting interfering impulses exactly at the instants when impulses are transmitted by the legitimate node, so as to create interference of a kind that will prevent the legitimate receiver node from correctly demodulating the packet it receives.

The time hopping codes presently proposed in the literature thus present serious vulnerabilities in terms of security.

In the frequency version, spectrum spreading by frequency hopping uses a pseudo-random sequence for selecting one of the available frequency subbands for transmission at a given instant. The rate at which the subband is changed may be a multiple or a submultiple of the binary rate of the data packet to be transmitted.

The same security problem arises with frequency hopping radio communications based on using a frequency hopping code. A malicious node having knowledge of the hopping sequence is in a position to listen to the succession of subbands used by the transmitter in order to gain access to the transmitted information; and it can also jam transmission effectively by transmitting on the subbands defined by the frequency hopping code.

There thus exists a need for a solution for better protecting communications between nodes of a frequency or impulse radio communications network against attacks carried out by malicious nodes.

3. SUMMARY OF THE INVENTION

The invention seeks to improve the situation with the help of a method of processing a data packet before transmission over a radio communications network by a succession of waveforms transmitted at positions defined by hopping codes, said positions possibly being time positions or frequency positions, the packet being transmitted over a communications channel of the network by a transmitter node to a receiver node. According to the invention, the method comprises the following steps that are performed for each bit of the data packet to be transmitted, referred to as a "current" bit:

calculating a hopping code at least as a function of the value of the current bit and of an encryption key generated by a pseudo-random generator, the encryption key having size greater than the maximum size of a data packet transmitted over the channel; and causing a waveform to be transmitted at the position defined by the calculated hopping code, the transmitted waveform being identical regardless of the value of the current bit.

The invention is equally applicable to radio communications based on time hopping codes and to those based on frequency hopping codes.

In impulse radio communication, the hopping code is a time hopping code and it defines an instant for transmitting a burst of impulses. With frequency radio communication, the hopping code is a frequency code and it defines a frequency subband for use in transmission selected from the entire available band.

With the invention, the hopping code used for transmitting the data of the packet is calculated at least as a function of the information bit and of an encryption key or keystream of size greater than a maximum size for a data packet transmitted over the communications channel.

Unlike the prior art, the calculated hopping code presents a period that is sufficiently long, given that it depends on the value of the bit to be transmitted and on using an encryption key of great length, for it no longer to be possible to deduce it even after listening to the transmission channel for a long time.

In addition, with the invention, and unlike the prior art, the waveform transmitted at the position defined by the hopping code is identical regardless of the value of the current bit.

Thus, with the invention, a malicious attacker listening to the transmission channel will see a succession of identical waveforms going past that are positioned at transmission instants, or frequencies as the case may be, that are not predictable, given the security properties of the encryption key.

For example, in impulse radio communication, the symbol time is subdivided into a certain number of slots. It is thus a burst of unmodulated impulses that is transmitted over the transmission channel in the slot corresponding to the time instant defined by the time hopping code as calculated by the invention.

With the invention, it is therefore much more difficult for the attacker to predict the instant at which the forthcoming bursts will be transmitted, and it will thus be much more difficult to carry out attacks of the eavesdropping or of the jamming type effectively.

The invention thus proposes a solution to the problem of protecting frequency hopping or impulse radio communications channels against attacks by malicious nodes.

In an aspect of the invention, the number of possible positions for the waveform is equal to $2^p$, where p is a non-zero integer, and said method comprises a prior step of mapping the current bit with a p-bit code word using a correspondence table shared with the destination node, and the calculation step comprises "exclusive-OR" type bit-wise addition of the code word corresponding to the bit to be transmitted and the encryption key having the same length p as the code word for the current bit, with the result corresponding to the calculated hopping code.

The function of the mapping step is to associate an information bit with a p-bit word. It is advantageous to work with a block of a bits when the symbol time has $2^p$ slots.

For an impulse radio communications system, it should be observed that a practical value of 4 or 5 may be selected for p, which corresponds to $2^4=16$ slots or $2^5=32$ slots. Such an order of magnitude presents the advantage of being compatible with the conventional orders of magnitude of a physical layer in UWB communication.

In a frequency hopping system, a practical magnitude is 64 to 128 subbands, corresponding to p=6 or 7.

The "exclusive-OR" function serves to perform the bit-by-bit substitution mechanism that is necessary in a keystream scheme.

Advantages of the "exclusive-OR" operation for implementing the bit-by-bit substitution function are the ease and the speed with which it can be implemented.

In another aspect of the invention, the encryption key is calculated from a pseudo-random generator set by means of a key of fixed size shared between the transmitter node and the destination node.

The pseudo-random generator is set using a secret key of fixed size shared between the transmitter and the receiver. This fixed-size key makes it possible to create the first encryption key, likewise secret, but of much greater length.

The invention also provides a method of processing a data packet received by a receiver node in a radio communications network, said data packet being transmitted by a transmitter node to a destination node as a succession of waveforms transmitted at positions defined by hopping codes, said positions possibly being time positions or frequency positions.

According to the invention, the method comprises the following steps performed for each waveform received:

predicting a first position for receiving a 0 value bit and a second position for receiving a 1 value bit by calculating first and second hopping codes at least as a function of an encryption key shared with the transmitter node;

detecting first and second quantities of energy received at the first and second predicted positions; and deciding on the value of the bit corresponding to the received waveform by comparing the energies detected at the first and second predictive positions.

Such a method is for use by a node on receiving a data packet in the network.

Using the invention, the receiver node that is the destination of the data packet is capable of generating the same encryption key as that used by the transmitter node. It can therefore predict two possible positions for the waveforms transmitted by the transmitter and can select the more probable by comparing the quantities of energy detected at those positions.

In an aspect of the invention, the method of processing a received data packet comprises a prior step of mapping possible bit values with a p-bit code word using a correspondence table shared with the transmitter node, p being a non-zero integer, and the prediction step comprises an "exclusive-OR" type bit-wise addition of the code word corresponding to a possible bit value and the encryption key, with the result corresponding to the calculated hopping code.

The destination node also shares with the transmitter node a correspondence table for mapping binary values of the information to be transmitted with code words of length p, p being a non-zero integer. If the receiver node is the destination of the packet, it can thus predict the positions of the received waveform by calculating two possible values of the hopping code, in a manner similar to the transmitter node, as a function of possible values for the data bit and for the encryption key.

For a conventional frequency hopping receiver based on detecting energy, it should be observed that performing the method of the invention for processing a received data packet requires the receiver node to possess a receiver circuit having two frequency synthesizers.

The invention also provides a device for communicating a data packet before transmission over a radio communications network, the device being suitable for performing the above-described method of the invention for processing before transmission.

The invention also provides a device for processing a data packet received by a receiver node, said device being suitable for performing the reception method of the invention.

The invention also provides a node of a radio communications network suitable for transmitting and receiving data packets in the form of a succession of waveforms transmitted at positions defined by hopping codes.

In the invention, such a node includes a device of the invention for processing a data packet before transmission and a device of the invention for processing a received data packet.

The invention also provides a radio communications system comprising a plurality of nodes of the invention.

The invention also provides a computer program including instructions for performing a method as described above for processing a data packet before transmission over the network when the program is executed by a processor. Such a program may use any programming language. It may be downloaded from a communications network and/or it may be recorded on a computer-readable medium.

Finally, the invention provides a computer program including instructions for performing a method as described above for processing a data packet received by a receiver node when the program is executed by a processor. Such a program may use any programming language. It may be downloaded from a communications network and/or stored on a computer-readable medium.

4. LIST OF FIGURES

Other advantages and characteristics of the invention appear more clearly on reading the following description of a particular implementation of the invention given merely by way of non-limiting illustrative example and with reference to the accompanying drawings, in which.

5. DESCRIPTION OF A PARTICULAR IMPLEMENTATION OF THE INVENTION

In the description below, as an implementation of the invention, consideration is given to an impulse radio communications channel using a time hopping code. Naturally, the invention is not limited to impulse radio, but it applies equally well to a communications channel using frequency hopping.

Figure 1:
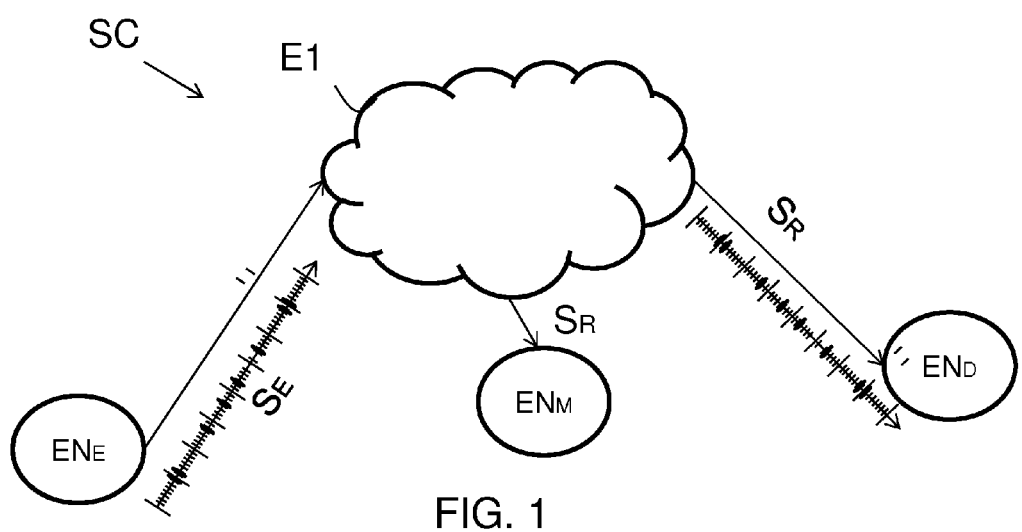
FIG. 1 is a diagram of an impulse radio communications system using a time hopping code of the invention.

With reference to FIG. 1, consideration to a radio communications system SC comprising nodes suitable for exchanging data packets over an impulse radio communications network RRI using a time hopping technique. A node $EN_E$ in this network, referred to as a transmitter node, transmits a data packet $DP_E$ in the form of a radio signal $S_E$ over a transmission channel of the network to a destination node $EN_D$. The data packet $DP_E$ comprises a series of data bits.

In the time hopping technique, which is known to the person skilled in the art, each data bit in the series is transmitted in the form of at least one symbol by means of a group or burst B of impulses. In the description below, the current information bit for transmission is written $b_n$.

A malicious node $EN_M$ is shown to make it clear that, like a legitimate node, it too listens to traffic on one or more transmission channels of the network RRI. Depending on the type of attack used, such a node listens to the transmission channel in order to intercept the information transmitted between the legitimate nodes $EN_E$ and $EN_D$, or else it jams the legitimate communication between $EN_E$ and $EN_D$ so as to prevent communication, or else it relays intercepted information in the form of malicious data packets in order to make the legitimate nodes inoperative (a denial of service (DoS) type attack).

Figure 2:
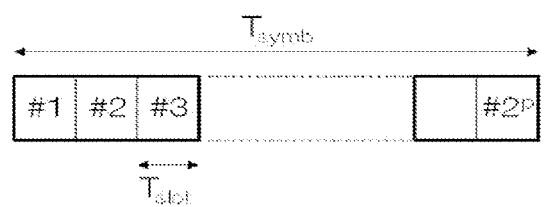
FIG. 2 is a diagram showing the structure of a symbol time in an impulse radio technique using a time hopping code.

FIG. 2 shows the principle of transmitting symbols carried by a burst B of impulses. Each symbol is transmitted in a time interval written $T_{symb}$ that is subdivided into $2^p$ subintervals referred to as slots of duration $T_{slot}$, using a non-zero integer p.

In the invention, the bits $b_n$, where n is an integer in the range 0 to N−1, of the series of bits making up the data packet $DP_E$ are processed in succession, at the transmitter node $EN_E$ by performing the transmission method, which is described below with reference to FIG. 3.

In a first step E1, a time hopping code $C_n$ is calculated for the current information bit $b_n$ as a function of the value of this current bit and of the value $k_n$ of an encryption key previously generated during a step E0 by a pseudo-random generator.

In the invention, the encryption key $k_n$ has length of the same order of magnitude as the series of information bits making up the data packet $DP_E$.

Advantageously, the encryption key $k_n$ is generated by a pseudo-random generator that is set on the basis of a key of fixed size shared between the transmitter node and the receiver node. An example of a configuration for a generator of such a key is described below with reference to FIG. 5.

In a step E2, a burst B of impulses is transmitted over the radio transmission channel in a slot of the symbol time as defined by the calculated time hopping code $C_n$.

The steps E0, E1, and E2 are iterated for each information bit of the data packet.

It should be observed that this burst B of impulses is used for transmitting the values of the information bit $b_n$ that make up the data packet without having resource to any modulation.

Figure 4:
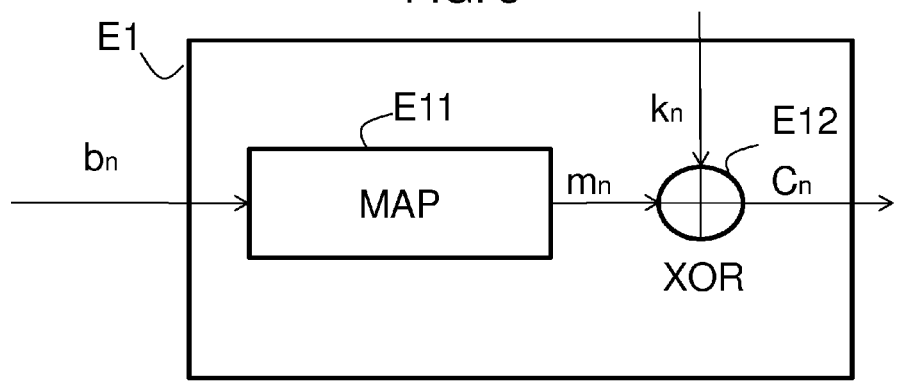
FIG. 4 shows the steps of the method in a particular implementation of the invention for processing a data packet before transmitting it.

With reference to FIG. 4, there follows a description of an implementation of the method for processing a data packet prior to transmission in a particular implementation of the invention.

In this implementation, the step E1 has a substep E11 of mapping the information bit $b_n$ with a p-bit code word $m_n$, where p is a non-zero integer, of value that depends on the input bit $b_n$, in application of a correspondence table that the transmitter node shares with the destination node.

It should be observed that this table is not necessarily secret and it might even be public.

In a substep E12, this p-bit code word is subjected to an exclusive or (XOR) operation represented by the symbol ⊕, with a p-bit word that has been extracted from an encryption key $k_n$.

In this implementation, it can be understood that the encryption key $k_n$ is an encryption keystream comprising p bits, that thus presents the same length as the code word $m_n$.

The result of the XOR operation gives the number of the slot $C_n$ in which the impulse burst B is to be transmitted.

Below, consideration is given to the particular example of a code word of length p=4. The hopping code $C_n$ may thus have $2^4=16$ values.

For a time hopping code, each of these 16 values corresponds to a possible slot number for the hopping code $C_n$. In a frequency hopping code, each of these 16 possible values corresponds to a transmission frequency or subband of the waveform.

For p=4, the mapping function between the current bit $b_n$ and the code word $m_n$ may be as follows:

$b_n=0 \rightarrow m_n=0101$;

$b_n=1 \rightarrow m_n=1010$.

By using the encryption keystream, i.e. a private key shared between the transmitter and the receiver, the information bits are not transmitted in the clear and can be transmitted without having recourse to any particular modulation scheme. Unlike the prior art, which for example uses pulse position modulation (PPM), this transmission generates a low probability of any successful use being made of the burst should it be intercepted.

Figure 5:
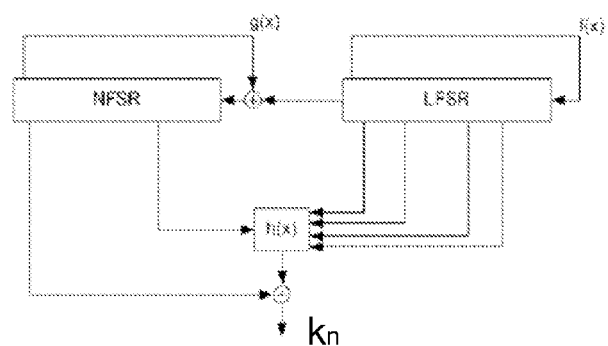
FIG. 5 shows an example of generating an encryption key by means of a pseudo-random generator in accordance with the invention.

FIG. 5 shows an example configuration for a encryption keystream generator implemented in step E0 of the method of the invention for processing before transmission. This configuration relies on a technique known in the prior art and described in the document entitled "Grain-A stream cipher for constrained environments" by M. Hell, T. Johanson, and T. Meier, eSTREAM, ECRYPT Stream Cipher Project, Report 2005/010 (2005). In that technique, generation of the encryption key $k_n$ is based on a linear feedback shift register (LFSR) and a non-linear feedback shift register (NFSR), together with a Boolean function h(x). In this figure, f(x) and g(x) respectively represent the polynomials that are characteristic of the LFSR and of the NFSR. This generator enables an encryption key $k_n$ to be created that satisfies certain security properties on the basis of an initial key of fixed size.

The initial key determines the initial state of the LFSR and of the NFSR.

The above-described transmission method is performed by a transmission device of the invention for transmitting data packets. Advantageously, the device is incorporated in a node of a frequency hopping or impulse radio communications network.

Figure 6:
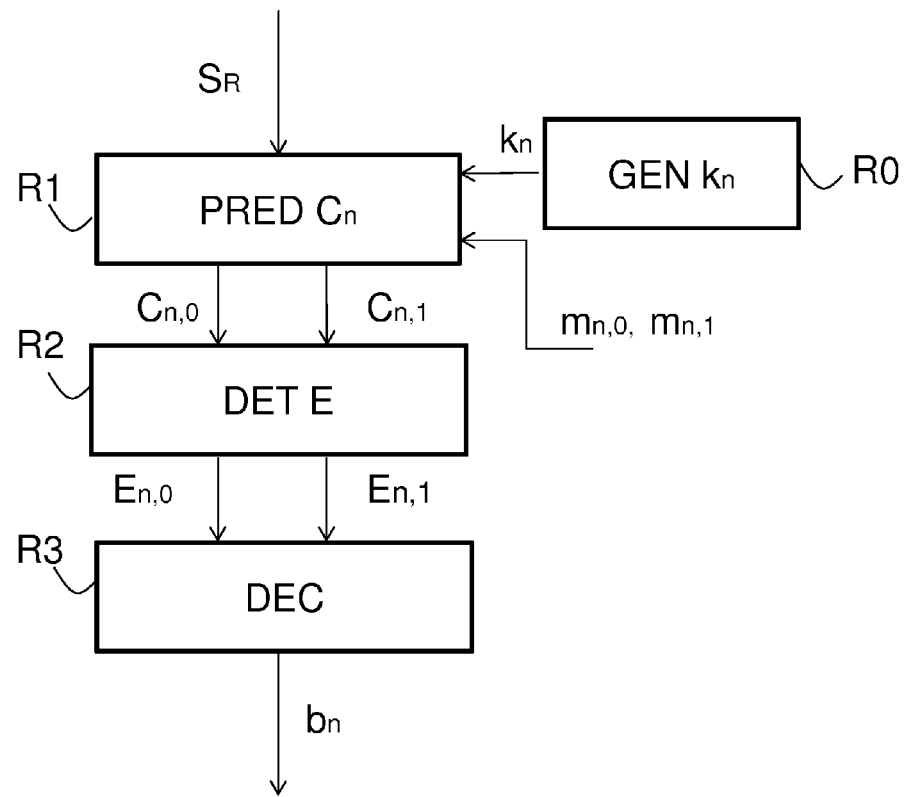
FIG. 6 shows the steps of the method of processing a data packet received by a node in such a network of the invention.

With reference to FIG. 6, there follows a description of an implementation of the method of processing a data packet $DP_R$ received in an impulse radio communications network using a time hopping code of the invention.

The data packet $DP_R$ is received in the form of a radio signal $S_R$ comprising impulse burst B at time instants that are defined by time hopping codes $C_n$ calculated by the transmitter node.

In a first step $R_0$, an encryption key $k'_n$ is generated for the purpose of receiving a bit $b'_n$ of the data packet $DP_R$. If the receiver node $EN_D$ is the legitimate destination of the data packet, it is suitable for generating the same encryption key $k'_n = k_n$ as the transmitter node $EN_E$.

In contrast, if it is a malicious node $EN_M$, it does not have means for generating an encryption key analogous to that used by the transmitter node.

At the end of this step, it is assumed that the encryption key $k_n$ is known to the receiver node.

During a step R1, possible values for time hopping codes used by the transmitter node are predicted on the basis of the encryption key $k_n$.

In a particular implementation of the invention, a code word $m_n$ of length p is associated by the transmitter node with the binary value of the information bit $b_n$ to be transmitted. Under such circumstances, the destination node also knows the correspondence table for mapping between the information bit and the p-bit code word. Using the table, it applies the mapping function to predict the position of the waveform corresponding to a bit $b_n$ of value 1 and of a bit $b_n$ of value 0, on the basis of calculated values of time hopping codes. Thus, for the bit n, the receiver calculates:

$$\begin{cases} C_{n,0} = k_n \oplus m_{n,0} \\ C_{n,1} = k_n \oplus m_{n,1} \end{cases}$$

In a step R2, a quantity of energy $E_{n,0}$ associated with the location corresponding to the time hopping code $C_{n,0}$ in the received signal $S_R$ and a quality of energy $E_{n,1}$ associated with the location corresponding to the time hopping code $C_{n,1}$ are detected.

Figure 7:
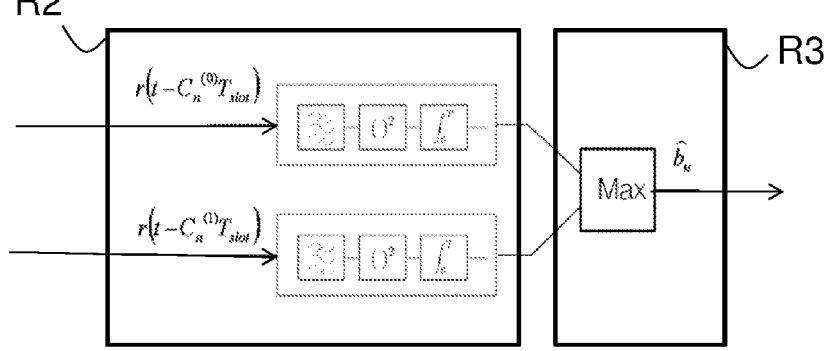
FIG. 7 shows the steps in the method of a particular implementation of the invention for processing a received data packet.

In a step R3, a decision is taken on the time location or slot that is the most probable, by comparing the quantity of energy $E_{n,0}$ $E_{n,1}$ that have been detected and by selecting the location corresponding to the greater quantity of energy, as shown in FIG. 7.

It can be understood that a malicious node $EN_M$, which a priori does not know the encryption key, is not in a position to reproduce the reception method of the invention.

It does not know firstly how to predict the instants at which impulse bursts are transmitted, which prevents it in particular from jamming the information transmitted by the transmitter node over the transmission channel. Secondly, the lack of modulation applied to the transmitted impulse bursts gives rise to low probability that it can make any use of the impulses that it might possibly intercept.

The above-described method of processing a received data packet is performed by a device of the invention for processing a received data packet. Advantageously, the device is incorporated in a node of a radio communications network using a hopping code.

Figure 8:
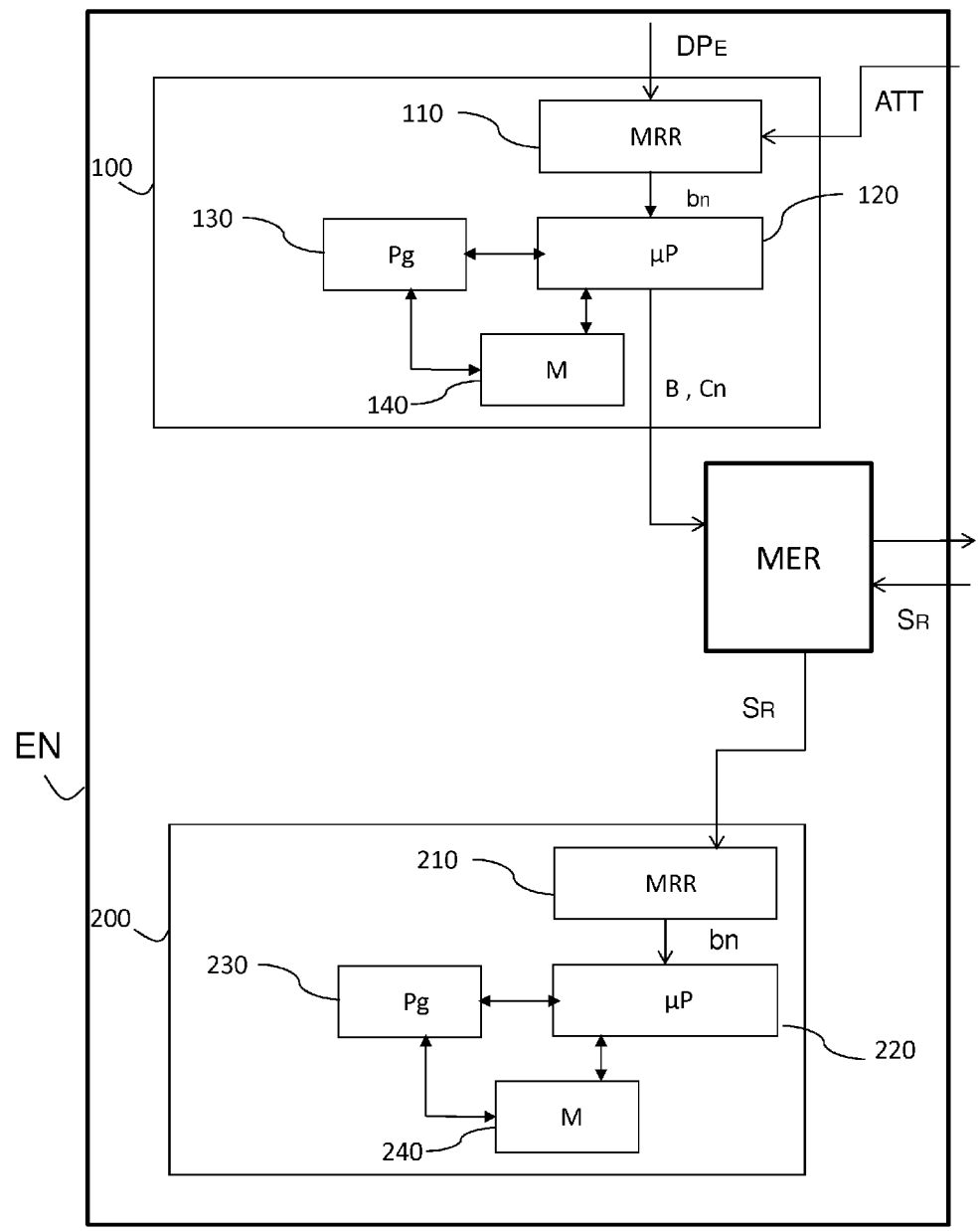
FIG. 8 is a diagram showing the structure of a node of the invention.

With reference to FIG. 8, there follows a description of an example structure for a node EN of the invention.

In a first aspect of the invention, the node EN has a device 100 for processing a data packet $DP_E$ before it is transmitted over a radio communications network RRI that uses a hopping code.

The processor device 100 of the invention comprises a receiver module 110 suitable for receiving a data packet DP, that the node EN seeks to send to at least one other node, referred to as the destination node $EN_D$ of the network RRI. The data packet $DP_E$ is processed by a processor unit 120 having a microprocessor suitable, for each information bit $b_n$ of the packet, for implementing means constituting the invention, in particular means for generating an encryption key $k_n$, means for calculating a hopping code $C_n$ on the basis of the value of the information bit $b_n$ and of the encryption key that has been generated, and means for controlling the transmission of a waveform at the position defined by the calculated hopping code, to a radio transceiver module MER of the node EN.

When using an impulse radio communications technique, the waveform is a group of impulses to be transmitted at an instant defined by the calculated value of the time hopping code.

When using a frequency hopping communications technique, the waveform is transmitted in a frequency subband defined by the calculated value of the frequency hopping code.

Figure 3:
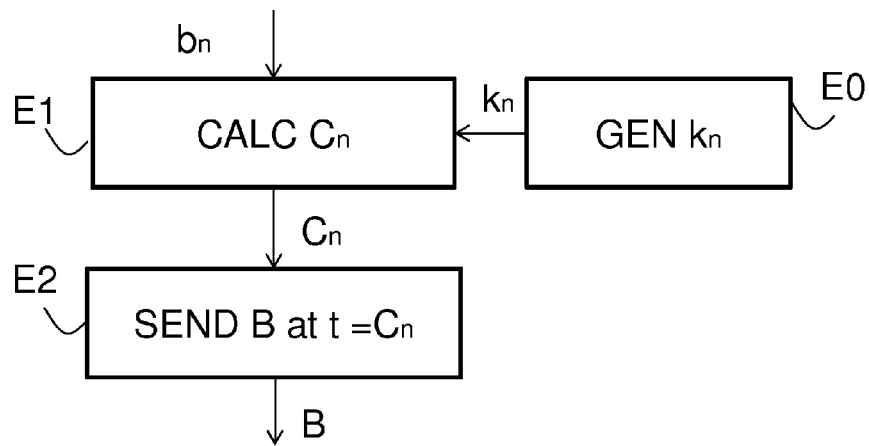
FIG. 3 shows the steps of the method of the invention for processing a data packet before transmission in such a network.

The processor device 100 of the invention also has a memory 140 storing a computer program 130 for performing the steps of the method of the invention for processing a data packet before transmission, as described in detail above with reference to FIGS. 3 and 4. On initialization and by way of example, the code instructions of the computer program 130 are loaded into a random access memory (RAM) prior to being executed by the processor of the processor unit 120.

In a particular implementation of the invention, the memory 140 also has linear and non-linear shift registers for use by the means for generating an encryption key using a running encryption scheme.

In an aspect of the invention, the invention also has a correspondence table for mapping possible values of an information bit and p-bit code words, which table is shared by the transmitter node and by the destination node.

In a second aspect of the invention, the node equipment EN also has a device 200 for processing a received data packet coming from a transmitter node $EN_E$.

The processor device 200 of the invention has a receiver module 210 suitable for receiving a data packet $DP_R$ as received by the radio transceiver module MER of the node equipment EN over a transmission channel of the network RRI. Such a packet is received in the form of a received signal $S_R$ comprising waveforms positioned in compliance with hopping codes calculated by the transmitter node. For communication by impulse radio, the waveforms are impulse bursts B positioned at instants defined by time hopping codes calculated by the transmitter node. For frequency hopping communication, the waveforms are positioned on subbands defined by frequency hopping codes calculated by the transmitter node.

The received signal $S_R$ is processed by a processor unit 220 fitted with a microprocessor suitable for performing means constituting the invention, and in particular means for generating an encryption key with the help of a pseudo-random generator analogous to that of the transmitter node, means for predicting two possible positions for the waveform in the received signal SR for a bit of the received data packet on the basis of the generated encryption key, means for detecting a quantity of energy associated with each possible location, and decision means for deciding on the more probable location on the basis of the detected quantities of energy.

The processor device 200 also has a memory 240 in which there is stored a computer program 230 for performing the steps of the method of the invention for processing on reception as described above with reference to FIGS. 6 and 7. On initialization, and by way of example, the code instructions of the computer program 230 are loaded into a RAM prior to being executed by the processor of the processor unit 220.

It should be observed that for frequency hopping communication, a node having a processor device 200 of the invention necessarily includes a receiver circuit with two frequency synthesizers, thus enabling it to detect simultaneously the energies associated with two waveforms in two different frequency bands.

A system for processing data packets transmitted over a radio communications network in accordance with the invention comprises at least two nodes such as the above-described node EN.

The invention claimed is:

1. A method comprising:
processing a data packet by a processing device of a transmitter node for transmission over a radio communications network as a succession of waveforms transmitted at positions defined by hopping codes, said positions being time positions or frequency positions, wherein processing comprises the following acts that are performed by the transmitter node for each bit of the data packet to be transmitted, referred to as the "current" bit:
calculating a hopping code at least as a function of a value of the current bit and of an encryption key generated by a pseudo-random generator, the encryption key having size greater than the maximum size of a data packet transmitted over the channel; and
transmitting a waveform from the transmitter node toward a destination node over a communications channel of the network by a radio transmitter of the transmitter node, the waveform being transmitted at the position defined by the calculated hopping code, the transmitted waveform being identical regardless of the value of the current bit.

2. The method according to claim 1, wherein:
the number of possible positions for the waveform is equal to $2^p$, where p is a non-zero integer, and said method comprises a prior step of mapping the current bit with a p-bit code word using a correspondence table shared with the destination node, and
the calculating act comprises "exclusive-OR" type bitwise addition of the code word corresponding to the bit to be transmitted and the encryption key having the same length p as the code word for the current bit, with the result corresponding to the calculated hopping code.

3. The method according to claim 2, wherein the encryption key is calculated from a pseudo-random generator set by using a key of fixed size shared between the transmitter node and the destination node.

4. A method comprising:
receiving a data packet by a receiver node in a radio communications network, said data packet being transmitted by a transmitter node to a destination node as a succession of waveforms transmitted at positions defined by hopping codes, said positions possibly being time positions or frequency positions;
processing the data packet by a processing device of the receiver node, comprising the following acts performed by the processing device for each waveform received by the receiver node:
predicting by the receiver node a first position for receiving a 0 value bit and a second position for receiving a 1 value bit by calculating first and second hopping codes at least as a function of an encryption key generated from a pseudo-random generator and shared with the transmitter node;
detecting by the receiver node first and second quantities of energy received in the received waveform at the first and second predicted positions;
deciding by the receiver node on a value of the bit corresponding to the received waveform by comparing the energies detected at the first and second predictive positions; and
outputting the value of the bit corresponding to the received waveform.

5. The method according to claim 4, wherein the method comprises a prior step of mapping possible bit values with a p-bit code word using a correspondence table shared with the transmitter node, p being a non-zero integer, and wherein the prediction step comprises an "exclusive-OR" type bitwise addition of the code word corresponding to a possible bit value and the encryption key, with the result corresponding to the calculated hopping code.

6. A treatment device of a transmitter node, comprising: a radio transmitter; a non-transitory computer-readable medium storing instructions thereon; a processor device, which when executing the instructions processes a data packet for transmission over a radio communications network in the form of a succession of waveforms transmitted at positions defined by time hopping codes, said positions possibly being time positions or frequency positions, the processor device performing the following acts on each bit of a data word of the data packet to be transmitted, referred to as the "current" bit: generating an encryption key shared between the transmitter node and the destination node; calculating a hopping code at least as a function of the current bit and of the encryption key; and a waveform from the transmitter node toward a destination node over a communications channel of the network by the radio transmitter, the waveform being transmitted at a position defined by the calculated hopping code, the transmitted waveform being identical regardless of a value of the bit to be transmitted.

7. A treatment device of a receiver node, comprising: a radio receiver, which is configured to receive a data packet from a radio communications network, said data packet being transmitted by a transmitter node to a destination node in the form of a succession of waveforms at positions defined by hopping codes; a non-transitory computer-readable medium storing instructions thereon; a processor device configured by the instructions to perform, for a waveform received at a given position, the following acts for each received waveform: predicting a first position for receiving a 0 value bit and a second position for receiving a 1 value bit by calculating first and second hopping codes at least as a function of an encryption key generated from a pseudo-random generator and shared with the transmitter node; detecting first and second quantities of energy received in the received waveform at the first and second predicted positions; deciding on a value of the bit corresponding to the received waveform by comparing the energies detected at the first and second predictive positions; and outputting the value of the bit corresponding to the received waveform.

8. An apparatus comprising: an equipment node of a radio communications network suitable for transmitting and receiving data packets in the form of a succession of waveforms transmitted at positions defined by hopping codes, the equipment node comprising: a radio transceiver; a non-transitory computer-readable medium storing instructions thereon; a processor device configured by the instructions to perform the following acts: processing a data packet before transmission, said positions being time positions or frequency positions, wherein processing includes the following acts on each bit of a data word of the data packet to be transmitted, referred to as the "current" bit: generating an encryption key shared between the equipment node and a destination node of the network; calculating a hopping code at least as a function of the current bit and of the encryption key; and a waveform from the equipment node toward the destination node over a communications channel of the network by the radio transceiver, the waveform being transmitted at a position defined by the calculated hopping code, the transmitted waveform being identical regardless of a value of the bit to be transmitted; and processing a received data packet, which is received from the radio communications network by the radio transceiver, which comprises for a waveform received at a given position, the following acts performed for each received waveform: predicting a first position for receiving a 0 value bit and a second position for receiving a 1 value bit by calculating first and second hopping codes at least as a function of an encryption key generated from a pseudo-random generator and shared with a transmitter node that transmitted the received waveform; detecting first and second quantities of energy received in the received waveform at the first and second predicted positions; deciding on a value of the bit corresponding to the received waveform by comparing the energies detected at the first and second predictive positions; and outputting the value of the bit corresponding to the received waveform.

9. The apparatus according to claim 8, wherein the apparatus comprises a communications system for communication by radio, the system comprising a plurality of equipment nodes.

10. A memory device comprising a computer program stored thereon and including instructions for performing a method for processing a data packet by a processor of a transmitter node when the processor executes the instructions, wherein the method comprises:
processing the data packet for transmission over a radio communications network as a succession of waveforms transmitted at positions defined by hopping codes, said positions being time positions or frequency positions, wherein processing comprises the following acts that are performed by the processor of the transmitter node for each bit of the data packet to be transmitted, referred to as the "current" bit:
calculating a hopping code at least as a function of a value of the current bit and of an encryption key generated by a pseudo-random generator, the encryption key having size greater than the maximum size of a data packet transmitted over the channel; and transmitting a waveform from the transmitter node toward a destination node over a communications channel of the network by a radio transmitter of the transmitter node, the waveform being transmitted at the position defined by the calculated hopping code, the transmitted waveform being identical regardless of the value of the current bit.

11. A memory device comprising a computer program stored thereon and including instructions for performing a method for processing a received data packet by a processor of a receiver node when the processor executes the instructions, wherein the method comprises:

receiving the data packet by the receiver node from a radio communications network, said data packet being transmitted by a transmitter node to a destination node as a succession of waveforms transmitted at positions defined by hopping codes, said positions possibly being time positions or frequency positions;

processing the data packet, comprising the following acts performed by the processor for each waveform received by the receiver node:

predicting by the receiver node a first position for receiving a 0 value bit and a second position for receiving a 1 value bit by calculating first and second hopping codes at least as a function of an encryption key generated from a pseudo-random generator and shared with the transmitter node;

detecting by the receiver node first and second quantities of energy received in the received waveform at the first and second predicted positions;

deciding by the receiver node on a value of the bit corresponding to the received waveform by comparing the energies detected at the first and second predictive positions; and outputting the value of the bit corresponding to the received waveform.

* * * * *